United States Patent [19]
Baker et al.

[11] 4,188,641
[45] Feb. 12, 1980

[54] STARTUP CIRCUIT FOR A TELEVISION RECEIVER

[75] Inventors: Scott H. Baker, Brockport; David E. Manners, Alexander, both of N.Y.

[73] Assignee: GTE Sylvania Incorporated, Stamford, Conn.

[21] Appl. No.: 928,670

[22] Filed: Jul. 28, 1978

[51] Int. Cl.² .............................................. H04N 5/44
[52] U.S. Cl. .................................................. 358/190
[58] Field of Search ........................... 358/190; 323/19

[56] References Cited
U.S. PATENT DOCUMENTS 3,814,851   6/1974   Nakagawa et al. ................. 358/190

Primary Examiner—Robert L. Richardson
Attorney, Agent, or Firm—John A. Odozynski

[57] ABSTRACT

In a television receiver containing both circuitry returned to the AC line and circuitry returned to an isolated chassis ground, a voltage supply isolated from the AC line for a horizontal oscillator returned to the chassis ground. The supply is developed by a winding magnetically coupled to an inductor in a switching regulator that is coupled to the AC line and operates at a frequency substantially equivalent to the horizontal oscillator frequency. With the horizontal oscillator operative, supply voltages for the remainder of the receiver's line-isolated circuitry can then be derived from windings on the flyback transformer.

18 Claims, 2 Drawing Figures

STARTUP CIRCUIT FOR A TELEVISION RECEIVER

FIELD OF THE INVENTION

This invention relates to television receiver power supply systems and more particularly to a system of separate supplies for circuitry coupled to an AC line and returned to a "Hot" ground and for circuitry electrically isolated from the AC line and returned to an Isolated ground.

CROSS-REFERENCE TO RELATED APPLICATIONS

Cross-reference is made to the following patent applications:
"Isolated B+ Voltage Sensing, High Voltage Shutdown" Ser. No. 928,671—Scott Howland Baker
"An Isolated Horizontal Drive Circuit For An Iso-Hot Chassis" Ser. No. 928,672 now abandoned—Scott Howland Baker
"Iso-Hot Startup Aid" Ser. No. 928,669—Scott Howland Baker and David Eugene Manners
all filed on the same date and assigned to the same assignee as this application.

BACKGROUND OF THE INVENTION

In general, prior art television receivers have been characterized as either the "hot-chassis" or "cold-chassis" type. In a hot-chassis receiver the necessary receiver supply voltages are directly derived from the AC line. The receiver chassis serves as the ground return for the supply voltages and is therefore electrically coupled to the AC line. This arrangement has proven less than optimal for a number of reasons. In particular, unless the television cabinet and operator-accessible controls are electrically isolated from the receiver chassis, it is possible that someone coming in contact with either the cabinet or controls will be caught across the AC line and therefore exposed to the danger of an electrical shock. The lack of isolation between the AC line and the receiver chassis causes additional problems when peripheral equipments, such as video tape recorders, are coupled to the receiver. In order for such equipments to interface properly with the receiver, it is necessary that there be a common reference, or return, potential. However, it is likely that substantial differences will exist between the reference potential of the peripheral equipment and that of the receiver circuitry. This can give rise to possibly damaging currents between the disparate reference potentials.

The above and other related problems can be avoided in a cold-chassis receiver. By using an isolation transformer with a primary winding connected to the AC line and a secondary winding connected to the receiver's circuitry, it is possible to maintain electrically isolated returns. However, in order to supply the receiver's power requirements, the isolation transformer must necessarily be of substantial size and weight, and of proportionate expense. Furthermore, the input transformer tends to degrade the receiver's power consumption efficiency.

The above problems led to the development of what has been called the "Iso-Hot" chassis. The Iso-Hot chassis, as the term indicates, is in essence a hybrid of the hot- and cold- chassis. Typically, a high voltage supply derived from the AC line is used to provide the DC collector supply voltage for the horizontal deflection output transistor. The collector supply voltage is coupled through the primary of the flyback transformer to the horizontal output transistor. As is well known, the horizontal output transistor is used to supply an alternating current to the primary of the flyback transformer. This current in turn induces a relatively high voltage in the flyback secondary from which is derived the anode voltage for the receiver's picture tube. The essence of the Iso-Hot concept is to provide additional windings on the flyback transformer so as to develop the relatively low voltage supplies required by the remainder of the receiver's circuitry. These windings and associated supplies can then be returned to a ground, typically the receiver chassis, that is electrically isolated from the flyback primary and the horizontal output transistor. As a result, a large part of the receiver's circuitry can be electrically isolated from the AC line derived supply and ground return.

However, the Iso-Hot concept, as described above, is not without its drawbacks. For instance, because the horizontal oscillator interacts with many other portions of the receiver's circuitry, it is necessary that its ground return be identical to that of, for example, the video circuitry. In other words, in order to preserve the isolation afforded by the flyback secondary, the voltage supply required by the horizontal oscillator must also be derived from the flyback secondary and must be returned to chassis ground. However, the voltage across the flyback secondary is magnetically induced by the alternating current in its primary. The alternating current in the primary results from the switching action of that winding between a source of voltage and a ground return. The switching portion is provided by the horizontal output transistor. The horizontal output transistor is driven by a horizontal driver transistor, which is in turn driven by the horizontal oscillator. But the horizontal oscillator is powered by a voltage derived from the flyback secondary. That is, in order for the oscillator to operate there must be a voltage induced in the flyback secondary. However, no voltage can be induced in the secondary until the oscillator is operating. Consequently, an Iso-Hot receiver must include a startup voltage supply for the horizontal oscillator and, in order to maintain the advantages afforded by the Iso-Hot concept; this supply must be isolated from the AC line.

One straight forward method of accomplishing this is to derive the startup supply from the secondary of a transformer whose primary is coupled to the AC line; but this is precisely what the Iso-Hot chassis was designed to avoid, an input isolation transformer. Even though the power requirements, as well as its weight and cost, of the Iso-Hot input transformer should be substantially less than that of the cold- chassis transformer, it is nevertheless desirable to provide a superior method of developing a startup supply.

In addition, in order to prevent damage to the receiver as a result of excessive horizontal deflection voltages or currents, it has become customary to monitor either the horizontal output transistor supply voltage or the flyback primary voltage and to disable the horizontal oscillator in response to an over-voltage condition. However, this is not easily accomplished in an Iso-Hot receiver wherein the flyback and the horizontal output supply voltage are electrically isolated from the horizontal oscillator. Any conventional method of doing this would necessarily sacrifice this feature.

OBJECTS OF THE INVENTION

Accordingly, it is a primary object of this invention to obviate the above-noted and other disadvantages of the prior art.

It is a further object of this invention to provide a start-up power supply for an Iso-Hot type television receiver.

It is a further object of this invention to provide such supply while maintaining the electrical isolation from the AC line of the circuitry powered from that supply.

It is a further object of the invention to maximize the efficiency and minimize the cost, weight, and size of that supply.

To that end, it is a further object of this invention to circumvent the necessity of an additional input power isolation transformer for that supply.

SUMMARY OF THE INVENTION

The above and other objects and advantages are achieved in one aspect of this invention in an Iso-Hot type television receiver comprising an input voltage supply derived from and electrically coupled to the AC line and returned to a Hot ground and comprising an isolated voltage supply electrically isolated from the AC line and returned to an Isolated ground. The isolated supply includes a winding magnetically coupled to an inductive element in a switching regulator coupled to the input supply. The voltage across the winding varies in relation to the current flowing through the inductive element.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Figure 1:
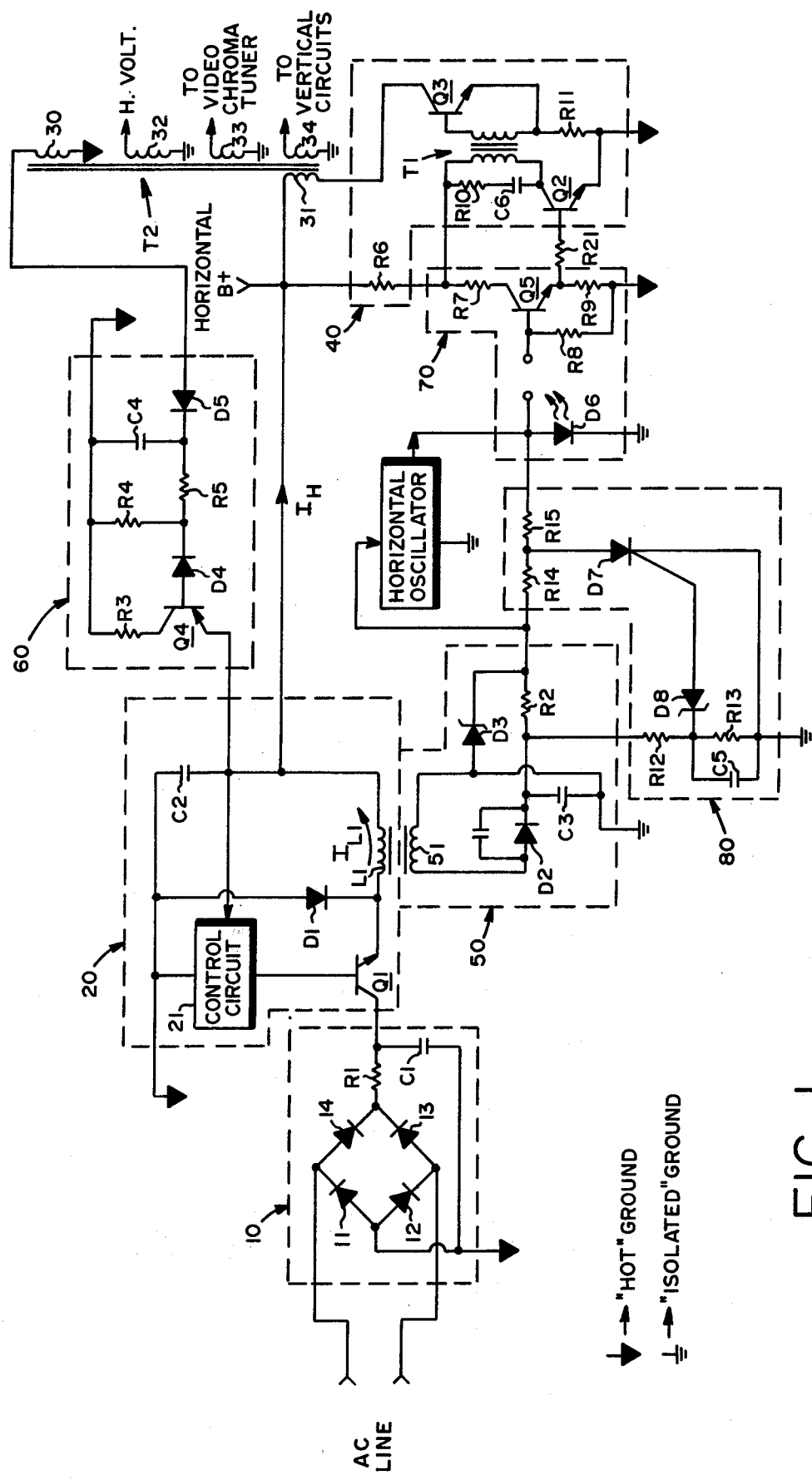
FIG. 1 is a schematic diagram of a circuit embodying the invention.

Referring now to FIG. 1, an input voltage is developed by a voltage source including an input voltage supply 10 and a voltage regulator 20. An unregulated voltage is derived from the AC line by a rectifier comprising diodes 11, 12, 13 and 14 and an RC filter circuit comprising a resistor R1 and a capacitor C1. Although a full-wave, bridge-type rectifier is shown in FIG. 1, other types of rectifiers may be used depending on the receiver's requirements. The input current to the rectifier is drawn from and returned to the AC line, thereby effecting an AC or, as will hereinafter be designated, a "Hot" ground return. Similarly, the RC filter is connected between the output of the regulator and the Hot ground.

Voltage supply 10 supplies a nominal unregulated voltage of approximately 165 volts to a voltage regulator 20. The regulator is of the type commonly referred to as switching regulator and comprises a series-pass transistor Q1, a diode D1, an inductive element in the form of a choke L1, a capacitor C2 and a control circuit 21. Transistor Q1 has a collector connected to the output of supply 10 and an emitter connected to the cathode of diode D1 and to one end of the choke L1. The anode of diode D1 is connected to the Hot ground and the other end of choke L1 is likewise coupled through a capacitor C2 to the Hot ground. In a manner described below, a regulated output of approximately 112 volts DC, hereinafter referred to a Horizontal B+, appears at the regulator output, that is, at the junction of L1 and C2. Base drive for Q1 is controlled by control circuit 21 which has an input connected regulated voltage output. Depending on the actual value of the Horizontal B+, the control circuit will effectively drive Q1 into either saturation or cut-off.

The operation of switching regulators is well understood by those having ordinary skill in the art. A detailed description of the operation and design of a switching regulator similar to regulator 20 appears in an article by Joshua A. Hauser, "Get With Switching Regulators", ELECTRONIC DESIGN, 9, Apr. 12, 1968, pp. 62–66.

Disregarding for now the effect of the startup aid circuit 60, described below, operation of the switching regulator is as follows:

As the television receiver is initially energized, the voltage at the collector of Q1 will rapidly approach its nominal value. The control circuit will provide base current to Q1 so that Q1 becomes saturated and the voltage at its emitter approximates 165 volts less the saturation voltage of Q1. The emitter current of Q1 will flow through L1 thereby exponentially charging C2 with an RLC time-constant determined by the values of L1, C2 and $R_L$, where $R_L$ is the effective load resistance across the Horizontal B+. In the embodiment presently being described, $R_L$ represents the load presented by the horizontal deflection circuit 40. When the voltage across C2 has increased to an upper trip level $V_U$, equal to approximately 112.2 volts, the control circuit will turn off Q1 and the voltage at its emitter will drop to a value equal to approximately one junction drop below ground. (That is, the junction drop of D1.) The current through L1, $I_{L1}$, which had been increasing during the time Q1 was saturated, will begin to decrease at a linear rate according to the relationship $$\frac{dI_{L1}}{dt} = \frac{V_{L1}}{L1},$$

where $V_{L1}$ is the DC voltage across L1. When Q1 is cut off it can be seen that $V_{L1}$ is approximately $-(V_U+0.7)$ volts. $I_{L1}$ will begin to decrease from its maximum value. After some time it will be less than the total current required by $R_L$, that is, the horizontal load current, $I_H$, and C2 will begin to be discharged. When the voltage across C2 falls below a lower trip level $V_L$, the control circuit will again provide base current to Q1; Q1 will become saturated and its emitter voltage will rapidly increase to approximately 165 volts. The current through L1 will now increase at a linear rate according to the relationship $$\frac{dI_{L1}}{dT} = \frac{-V_L}{L1}.$$

Figure 2:
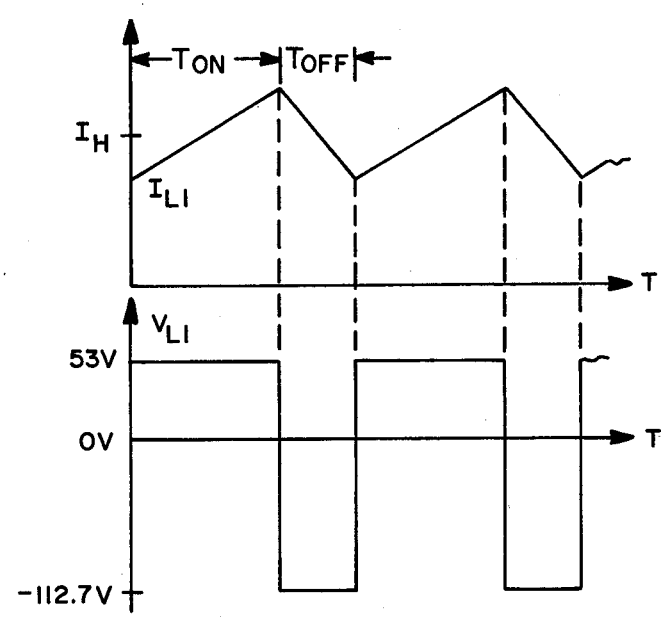
FIG. 2 is an illustration of voltage and current waveforms appearing in an inductive element of a switching regulator employed in the circuit of FIG. 1.

(For the purposes of this description it can be assumed that $V_U$ and $V_L$ are sufficiently close to Horizontal B+ so that the rates at which $I_{L1}$ decreases and increases are approximately $$\frac{-112.7 \text{ volts}}{L1} \text{ and } \frac{165 - 112 \text{ volts}}{L1},$$

respectively.) At some subsequent point in time the current through L1 will become greater than $I_H$. The additional current will recharge C2 until the voltage across it reaches $V_U$ and the cycle will reverse. FIG. 2 shows significant voltage and current waveforms during steady-state (some time after the receiver has been initially energized), operation of the switching regulator. As indicated above, during the time that Q1 is conducting, $T_{ON}$, the voltage across L1 is equal to approximately +53 volts and during the time Q1 is cut off, $T_{OFF}$, the voltage across L1 is equal to −(112.7) volts. Because these voltages determine the rates at which the current through L1 respectively increases and decreases and they also establish length of the switching regulator cycle, $T_{ON}+T_{OFF}$. Given the nominal unregulated input voltage of 165 volts, a Horizontal B+ of 112 volts, and a nominal horizontal load current equal to approximately 600 ma at an AC line voltage of 120 volts, the values of L1 and C2 can be chosen so that the switching regulator's operating frequency, $1/(T_{ON}+T_{OFF})$, is approximately equal to 15, 750 Hz, the horizontal deflection frequency. (The article by Hauser, referred to above, provides detailed design equations for switching regulators, including equations for the determination of the switching regulator operating frequency.) In particular, with C2 as a 50 uF electrolytic, L1 was constructed from 136 turns of 22s wire on a ferromagnetic core.

As indicated above, the regulated 112-volt output of the switching regulator comprises the requisite power supply for the horizontal deflection circuit 40. The 112 volts is coupled through a dropping resistor R6 to the series combination of resistor R10 and capacitor C6 and through R10 and C6 to the collector of the horizontal drive transistor Q2. Q2 develops an alternating current in the primary winding of the horizontal output transformer T1. The primary of T1 is connected between the collector of Q2 and the junction of R6 and R10. A secondary winding of T1 is connected between the base and emitter of the horizontal output transistor Q3. The collector of Q3 is coupled through a primary winding 31 of the flyback transformer T2 to the 112-volt supply.

In conventional television receivers the horizontal deflection circuit serves at least the dual purposes of driving both the horizontal deflection yoke (not shown) as well as the flyback transformer. The details of the horizontal output circuit operation are well understood by those skilled in the art. During the latter portion of the trace period of the horizontal cycle the horizontal output transistor Q3 is conducting, thereby providing current for both the deflection yoke and the primary of the flyback transformer. During retrace Q3 is abruptly cut off, thereby resulting in a AC voltage of approximately 920 volts peak across the primary winding 31. This voltage is magnetically coupled to winding 32, producing a peak voltage of approximately 8 to 10 K volts across that winding. This voltage is then rectified and multiplied to provide the 25 or 30 Kilovolts required to operate the receiver's cathode ray tube.

In addition to deriving the high voltage supply from the flyback transformer, it has been found convenient to provide additional windings on the flyback transformer in order to accommodate the voltage supply requirements of other portions of the receiver's circuitry. In particular, winding 33 is used to develop a voltage supply for the receiver's video, chrominance and tuner circuits; winding 34 is used to develop a supply for the vertical deflection circuitry. Typically the waveforms across these windings are rectified and filtered to provide the desired supply voltages. A specific advantage of this configuration is that, because the voltages in these windings are magnetically induced from the primary winding, it is possible to return these windings, as well as their associated voltage supplies to a chassis or, as will be hereinafter designated an "Isolated" ground, instead of the Hot ground. As a result, a large portion of the receiver's circuitry can be advantageously isolated from the Hot ground. Because, in conventional receivers, the horizontal oscillator both receives signals from and provides signals to other circuitry in the receiver, the oscillator must have a ground return in common with that circuitry; that is, in an Iso-Hot receiver it is ordinarily necessary that the horizontal oscillator be returned to the Isolated ground and consequently be powered from an isolated supply. However, because operation of the horizontal oscillator is a prerequisite to the development of the isolated supply voltages derived from windings 33 and 34 of the flyback transformer, it is not possible to simply include another winding on the flyback transformer for the purposes of supplying a voltage to the horizontal oscillator. In known Iso-Hot chassis receivers, an isolated supply voltage for the horizontal oscillator is developed by including the customary input power transformer coupled to the AC line, the isolated supply therefore being magnetically coupled but electrically isolated from the AC line. Such a system is described in United Kingdom patent specification No. 1,481,518 to Wolfgang Dietz, published Aug. 3, 1977, regarding a "Power Supply and Line Deflection Circuit for Television Receivers". The isolated startup voltage supply 50 of the subject invention, presently to be described, represents a considerably more desirable configuration.

As alluded to above, choke L1 of the switching regulator may comprise a winding on one of many known types of ferromagnetic cores. For example, although a ⅜-inch, double-E type core with a 20 mm air gap has been used in conjunction with the switching regulator illustrated in FIG. 1, it is also possible to employ other core structures, such as the U or torroid type. Startup circuit 50 comprises a winding 51 wound on the same core as L1 and magnetically coupled to but electrically isolated from it. Winding 51 has one end connected to the Isolated ground and the other end connected to the anode of a diode D2. Winding 51 may consist of, for example, 46 turns of number 28 wire. The alternating current in choke L1 induces an alternating voltage at the same frequency in winding 51. The amplitude of this voltage depends on, inter alia, the amplitude of the current in L1 and the number of turns of wire of L1 and of winding 51. The voltage across winding 51 is then rectified and filtered by a rectifier-filter comprising a diode D2 and a capacitor C3 connected between the cathode of D2 and the Isolated ground. An unregulated voltage of approximately 25 to 30 volts is coupled by resistor R2 to the cathode of a zener diode D3. The anode of D3 is connected to the Isolated ground. D3 effects a regulated voltage of, say, 20 volts which then is used as the supply voltage for the horizontal oscillator. The startup circuit described herein is superior to the conventional input power transformer type in at least the following respects: because the switching regulator self-oscillating frequency is on the order of the horizontal oscillator frequency, 15, 750 Hz, it is possible to derive the startup supply from a winding wound on a small (⅝ inch) lightweight, ferromagnetic core. This is a considerable advantage in comparison with the relatively heavy and expensive iron-core input isolation transformer. Furthermore, more efficient and effective filtering of the rectified 15, 750 Hz unregulated voltage may be obtained than would likely be attainable of the 60 Hz, AC line voltage.

Operation of the startup supply as the receiver is initially turned on and at lower than nominal line voltages is assured by a startup aid circuit 60 connected between the output of the switching regulator and the Hot ground. The startup aid circuit places a switchable momentary load across the regulator output immediately subsequent to the energization of the television receiver. This circumvents problems encountered at startup and under low-line conditions, when the horizontal load current is likely to be lower than its nominal or steady-state value. The additional incremental load increases the current flowing in L1 winding and therefore the voltage induced in winding 51, thereby allowing the horizontal deflection system to be operational at startup and line voltages as low as 85 volts.

The startup aid comprises a momentary load in the form of a PNP transistor Q4, a resistor R3, and a diode D4. Q4 has an emitter connected to the output of the voltage regulator and a collector connected to one end of R3, the other end of R3 being connected to the Hot ground. The base of Q4 is also coupled through the series-connected diode D4 and resistor R4 to the Hot ground. The startup aid circuit also comprises a startup detector in the form of resistors R4 and R5, a diode D5, and a capacitor C4. R4 is connected between the cathode of D4 and the Hot ground. R5 is connected between the cathodes of D4 and D5, while C4 is connected between the cathode of D5 and the Hot ground. The anode of D5 is connected to one end of a winding 30 on the flyback transformer. The other end of winding 30 is connected to Hot ground. The voltage across winding 30 depends on the signal developed by the horizontal deflection circuit and therefore on the operation of the horizontal oscillator and the voltage developed by the startup supply.

Subsequent to the energization of the television receiver, D4 and R4 provide a source of base current for Q4 to Hot ground. Assuming Q4 becomes saturated, representing negligibly low impedance, and assuming a value of 2.2 K ohms for R3, an additional incremental current of approximately 50 ma will flow through L1, thereby enhancing the operation of the startup circuit. As the horizontal deflection circuit begins to operate, an increasing periodic voltage, ultimately reaching a nominal peak value of 190 volts, is induced in winding 35. This voltage is rectified by D5 and stored on C4. The voltage across C4 is divided by the resistive divider R4–R5 and coupled to the cathode of D4. Shortly after the energization of the television receiver, the voltage on the cathode of D4 will reach a predetermined value, sufficient to turn off Q4. This occurs when the voltage at the cathode of D4 becomes approximately equal to or greater than the value of the Horizontal B+, nominally 112 volts. D4 will become back-biased, thereby cutting off Q4 and disconnecting the additional 2.2 K ohm (50ma) momentary load from the output of the voltage regulator.

Although a specific embodiment of a startup aid has been described above, practitioners having ordinary skill in the art will recognize that particular variations and design choices may be made without departing from the scope of the subject invention. For example, the value of R3 can be varied according to additional incremental load desired. Roughly, the additional load will be equal, in current, to the value of the regulated voltage divided by the value of R3. Also, the number of turns required of winding 30 is determined by the magnitude of the voltage desired to be induced therein and accordingly depends on the magnitude of the regulated supply voltage and the number of turns on the winding 31. The criterion is that winding 30 develop a voltage sufficient to electrically disconnect the momentary load once the horizontal deflection system has become substantially fully operational. Furthermore, embodiments are conceivable wherein a permanent, additional alternating load appears across the voltage regulators output. In these situations it is only necessary to remove D5 and C4 so that Q4 is normally conducting but momentarily turned off during the retrace period.

Related to the requirement that, in order to maintain the isolation of receiver video, chroma circuitry, etc., the horizontal oscillator be powered from an isolated supply and returned to an isolated ground is the requirement that the output signal from the horizontal oscillator be coupled to the horizontal deflection circuit without sacrificing electrical isolation. Again, the conventional method of achieving this result is to transformer-couple the output of the horizontal oscillator to the deflection circuit 40. Although this is a workable situation, the degree of isolation achieveable between the oscillator and deflection circuit is limited by the leakage inductance of the coupling transformer. A superior method is comprised by the subject invention.

Again, referring to FIG. 1, the output of the horizontal oscillator is coupled to the input of the horizontal deflection circuit by an isolated horizontal drive circuit 70. The drive circuit includes an input stage connected between the output of the horizontal oscillator and the Isolated ground as well as an output stage coupled to the input of the horizontal deflection circuit and to the Hot ground. In the embodiment of FIG. 1, the input stage comprises an optical transmitting device in the form of a Light-Emitting-Diode (LED) D6. The output stage comprises an optical receiving device in the form of a phototransistor Q5. D6 has an anode coupled to the output of the horizontal oscillator and a cathode connected to the Isolated ground. The output of the drive circuit, that is, the emitter of Q5, is coupled through a resistor R12 to the input of the deflection circuit. The emitter of Q5 is also coupled through a resistor R9 to the Hot gound. The collector voltage of Q5 is derived from the Horizontal B+ through the dropping resistor R6 and a collector resistor R7. R6 is chosen so that the maximum collector voltage for Q5 (that is, when its collector current is zero) will be approximately 53 volts.

Operation is as follows: during the horizontal trace period the horizontal oscillator will provide sufficient current to D6 so that it emits radiation which is in turn optically coupled to Q5. The phototransistor becomes conductive and provides base current to Q2. A portion of the resulting collector current of Q2 will flow through the primary winding of the horizontal driver transformer T1. The voltage induced in the secondary of T1 will provide base drive for the horizontal output transistor Q3. Q3 will operate as a switch; shorting one end of the flyback transformer and deflection winding (not shown) to Hot ground during the latter portion of the trace period and disconnecting them during the retrace period.

Additionally, in the design of contemporary television receivers it has been deemed judicious to include circuitry for somehow sampling the CRT high-voltage supply and shutting down the horizontal deflection circuit in response to an overvoltage condition. However, because it is not necessarily desirable to sample the Hi-voltage supply directly, conventional receivers have sampled the 112-volt Horizontal B+ voltage, or an analogous voltage supply. Since the CRT high voltage is related to the value of the horizontal output transistor supply voltage, an increase in voltage above the nominal 112-volt value will be accompanied by an increase in the Hi-voltage. Accordingly, the 112-volt supply can be monitored and the horizontal deflection system can be disabled once the supply voltage exceeds a predetermined value. However, because the Horizontal B+ is derived from the AC line, it seems apparent that such AC-voltage shutdown circuitry must be derived from the AC line and returned to the Hot ground. In order to preserve the isolation of the receiver's circuitry it is desirable to devise an alternate method of effecting high-voltage shutdown. This has been accomplished in prior art Iso-Hot receivers by including yet another winding on the flyback transformer. The voltage across this winding will be approximately proportional to the Hi-voltage and can be monitored and used to shut down the horizontal deflection system as described above. This system suffers from its own drawbacks. In particular, voltage ringing of the flyback or overshoots resulting from an arc in the picture tube, reflecting a Transient into the flyback, can cause false tripping of shutdown circuit. The High-voltage shutdown circuit 80 maintains both electrical isolation from the AC line and immunity from false tripping associated with flyback-related shutdown circuitry The shutdown circuit 80 comprises series-connected sampling resistors R12 and R13 connected between the unregulated isolated supply and the Isolated ground. Series-connected resistors R14 and R15 are connected between the regulated isolated supply voltage and both the output of the horizontal oscillator and the input of the coupling device 60, that is, to the anode of the LED. An electronic switching device in the form of a silicon controlled rectifier (SCR) D7 has a first electrode, that is, anode connected to the junction of R14 and R15 and a second electrode, that is, a cathode connected to the Isolated ground. A zener diode D8 is connected between the junction of R12 and R13 and the third electrode (gate) of D7.

As described above, the amplitude of the voltage across winding 51 is directly dependent on the amplitude of the current through L1 and is therefore directly related to the actual voltage of the nominal 112-volt supply. D2 and C3 rectify and filter the voltage across winding 51 to produce a substantially DC voltage proportional to the magnitude of the Horizontal B+. R12 and R13 divide the unregulated isolated supply voltage to a value normally lower than the breakdown voltage of D8. Capacitor C5, connected between the junction of R12 and R13, smooths any remaining ripple in the divided voltage and assures D.C. triggering of the shutdown circuit. R12 and R13 are selected so that when the Horizontal B+ exceeds 117 volts, the voltage on the cathode of D8 will exceed its breakdown voltage, for example, 5.6 volts; D8 will become conductive, thereby triggering D7. The output of the horizontal oscillator will be effectively shorted through R15 and D7 to the Isolated ground, substantially no drive current will reach D6 and the horizontal deflection circuit will be disabled. Because the voltage supply for the shutdown circuit 60 is derived from the Horizontal B+, which remains ON during a shutdown condition, the shutdown circuit latches ON, that is, the horizontal deflection remains disabled even though the shutdown condition may have subsided. In order to again enable the horizontal deflection circuit it is necessary to switch the television receiver OFF and then ON.

Accordingly, the subject invention represents a superior implementation of the Iso-Hot concept in a television receiver. The invention, as described, circumvents all or many of the drawbacks attendent prior art Iso-Hot receivers that require an additional input power transformer for the startup supply or that require an interstage transformer to effectuate coupling of the horizontal oscillator to the horizontal deflection circuit. In addition, the startup aid circuit assures performance at low line voltages or other anamolous operating conditions and has applicability separate from its use in conjunction with the isolated horizontal oscillator supply disclosed herein. Also, the shutdown circuit provides a solution to the difficulties encountered in detecting an overvoltage condition in an AC coupled voltage supply and then shuting down circuitry isolated from the AC line while maintaining that isolation.

Nevertheless, while there has been shown and described that are at present considered the preferred embodiments of the invention, it will be obvious to those skilled in the art that various changes and modifications may be made therein without departing from the scope of the invention as defined by the appended claims.

What is claimed is:

1. A television receiver comprising:
   an input voltage supply for developing an input voltage, the supply being derived from and electrically coupled to the AC line and returned to a Hot ground;
   a switching voltage regulator coupled to the input supply and returned to the Hot ground for providing a regulated output voltage to a load circuit, the regulator comprising an inductive element across which appears a voltage alternating at a predetermined frequency and through which flows a current varying at that frequency;
   and an isolated startup voltage supply electrically isolated from the AC line, from the input voltage supply and from the switching voltage regulator, said isolated supply returned to an Isolated ground and comprising a winding magnetically coupled to the inductive element of the switching regulator so that the voltage across the winding varies at substantially the predetermined frequency.

2. A television receiver as defined in claim 1, wherein the inductive element comprises a first fixed number of turns of wire wound on a ferromagnetic core and the winding comprises a second fixed number of turns of wire wound on the same core.

3. A television receiver as defined in claims 1 or 2 wherein the switching regulator is so arranged and constructed that the predetermined frequency is substantially equivalent to the horizontal deflection frequency, nominally approximately 15,750 Hz whereby the voltage across the winding varies at substantially that frequency.

4. A television receiver as defined in claim 2 wherein the winding has one end connected to the Isolated ground and another end connected to a rectifier-filter, the rectifier-filter also connected to the Isolated ground, whereby a voltage is developed that depends on the number of turns of the inductive element and on the number of turns of the winding.

5. A television receiver as defined in claim 4 wherein the switching regulator is so arranged and constructed that the predetermined frequency is substantially equivalent to the horizontal deflection frequency, nominally approximately 15,750 Hz whereby the voltage across the winding varies at substantially that frequency.

6. A television receiver as defined in claim 5 wherein the isolated supply comprises a zener diode coupled to a rectifier-filter and connected to the Isolated ground so that a regulated voltage appears at the output of the isolated supply.

7. A television receiver as defined in claim 6 further comprising a horizontal oscillator electrically coupled to the output of the isolated supply and optically coupled to a horizontal deflection circuit and returned to an Isolated ground.

8. A television receiver comprising a switching regulator derived from an input supply coupled to the AC line and returned to a Hot ground wherein the receiver's horizontal deflection circuitry is coupled to the switching regulator and is returned to a Hot ground and wherein the switching regulator's operating frequency is substantially equal to the horizontal deflection frequency, the improvement comprising an isolated supply for the receiver's horizontal oscillator, the isolated supply being electrically isolated from the AC line and returned to an Isolated ground and comprising a winding magnetically coupled to the switching regulator so that a voltage is induced in the winding that varies at substantially the horizontal deflection frequency whereby the isolated supply is physically smaller than an otherwise equivalent isolated supply that is magnetically coupled to the AC line and therefore develops a voltage that varies at substantially the AC line frequency.

9. An improvement as defined in claim 8 wherein the switching regulator comprises an inductor consisting of a fixed number of turns of wire wound on a ferromagnetic core and the winding consists of a fixed number of turns of wire wound on the same core whereby the winding is magnetically coupled to but electrically isolated from the inductor.

10. An improvement as defined in claim 9 wherein the isolated supply comprises a rectifier-filter connected between the winding and the Isolated ground for developing a voltage whose amplitude depends on the magnetic coupling between the winding and the inductor and further comprises a zener diode coupled to the rectifier-filter so that a regulated voltage appears at the output of the voltage supply.

11. An improvement as defined in claims 8, 9, or 10 wherein the Isolated ground is the receiver chassis.

12. An improvement as defined in claim 10 wherein the output of the isolated supply is coupled to a horizontal oscillator that is itself connected to the Isolated ground but electrically isolated from the AC line.

13. A television receiver comprising:
an input voltage supply electrically coupled to the AC line and returned to a Hot ground;
a switching regulator, operating at substantially the horizontal deflection frequency, coupled to the supply and returned to the Hot ground for providing a first regulated output voltage;
an isolated voltage supply electrically isolated from the AC line, from the input voltage supply and from the switching regulator, said isolated supply returned to an Isolated ground and comprising a winding magnetically coupled to the switching regulator, whereby a voltage appears across the winding from which is developed a second regulated voltage;
a horizontal deflection circuit powered by the first regulated voltage and returned to the Hot ground;
a horizontal oscillator powered by the second regulated voltage, returned to the Isolated ground, and optically coupled to the horizontal deflection circuit.

14. A television receiver as defined in claim 13 further comprising a flyback transformer coupled to the horizontal deflection circuit; said transformer comprising windings connected to the Isolated ground and electrically isolated from the AC line across which windings appear periodic voltages from which are derived voltages for powering at least the receiver's video and chroma circuitry.

15. A television receiver as defined in claim 13 wherein the horizontal oscillator is coupled to the horizontal deflection circuit by isolated drive circuit comprising an optical transmitting device connected between the output of the horizontal oscillator and the Isolated ground and an optical receiving device coupled to the horizontal deflection circuit and to the Hot ground.

16. A television receiver as defined in claim 15 further comprising a startup aid circuit connected between the output of the switching regulator and the Hot ground.

17. A television receiver as defined in claim 16 wherein the startup and circuit is coupled to a winding on the flyback transformer, the voltage induced in the winding being indicative of the operation of the horizontal deflection circuit.

18. A television receiver as defined in claim 16 further comprising an isolated high-voltage shutdown circuit connected between the output of the isolated voltage supply and the Isolated ground.

* * * * *

UNITED STATES PATENT AND TRADEMARK OFFICE
CERTIFICATE OF CORRECTION

PATENT NO. : 4,188,641
DATED : February 12, 1980
INVENTOR(S) : Scott Howland Baker and David Eugene Manners It is certified that error appears in the above-identified patent and that said Letters Patent are hereby corrected as shown below:

Col. 12, Line 51: "startup and circuit" should read --- startup aid circuit ---.

Signed and Sealed this

Seventeenth Day of June 1980

[SEAL]

Attest:

SIDNEY A. DIAMOND

Attesting Officer

Commissioner of Patents and Trademarks